UNITED STATES PATENT OFFICE.

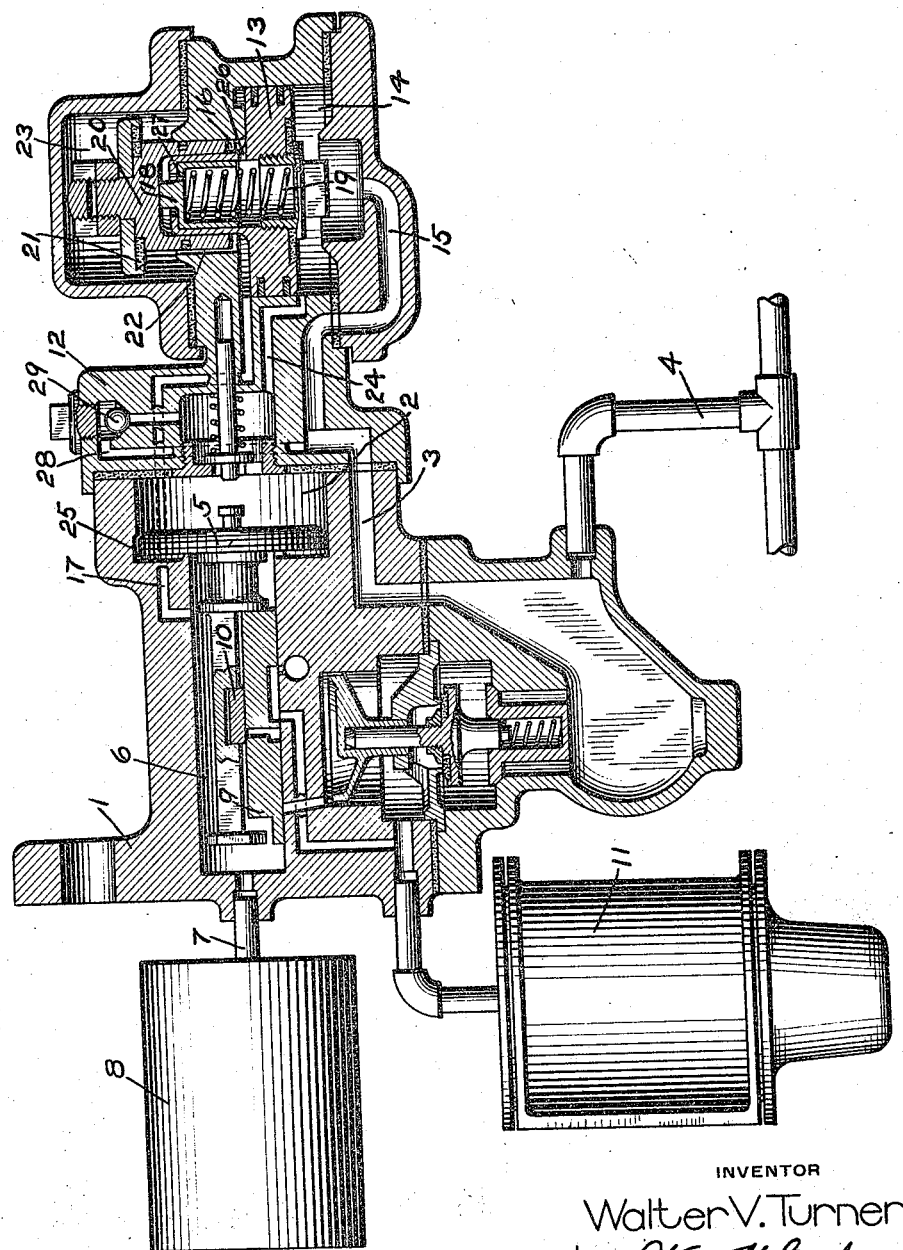

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE DEVICE.

1,286,843.                Specification of Letters Patent.           Patented Dec. 3, 1918.

Application filed March 1, 1918. Serial No. 219,890.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brake Devices, of which the following is a specification.

This invention relates to fluid pressure brakes, and more particularly to a triple or equalizing valve device.

It occasionally happens that a triple valve piston will offer an undue resistance to movement from application position, in releasing the brakes, due to excessive friction, and if the piston rings happen to be leaky, the difficulty of effecting the movement of the piston to release position is further increased, since the leakage tends to prevent the building up of a sufficient differential between the brake pipe pressure and the auxiliary reservoir pressure.

The principal object of my invention is to provide means for at all times insuring the prompt movement of the triple valve piston from application to release position.

In the accompanying drawing, the single figure is a diagrammatic view of a car air brake equipment, with the triple valve device in section, and showing my improvement applied thereto.

The triple valve device may be of the usual construction comprising a casing 1, having a piston chamber 2 connected by passage 3 to the brake pipe 4 and containing piston 5 and having a valve chamber 6, connected by pipe 7, with auxiliary reservoir 8, and containing a main slide valve 9 and an auxiliary valve 10 adapted to be operated by piston 5.

The supply and release of fluid under pressure to and from the brake cylinder 11 is controlled in the usual way by operation of the valves 9 and 10.

According to the preferred form of my invention, the usual triple valve piston chamber cap is replaced by a special cap 12 containing a piston 13 having chamber 14 at one side connected by passage 15 to the brake pipe passage 3 and chamber 16 at the opposite side connected by passage 17 with the valve chamber 6 and the auxiliary reservoir.

Within the piston 13 is mounted a spring stop 18, subject to the pressure of a coil spring 19 and said stop is adapted to engage a movable abutment 20. The abutment 20 is provided with a seat ring 21 adapted in the closed position of the abutment to cut off communication from chamber 17 through a restricted feed groove 22 to chamber 23.

In operation, upon charging the brake pipe 4, fluid flows through passage 15 to chamber 14 and shifts the piston 13, so as to open communication from passage 15 to a passage 24 leading to piston chamber 2. The valve chamber 6 and the auxiliary reservoir 8 are then charged from piston chamber 2 through feed groove 25 in the usual manner.

Fluid from the auxiliary reservoir flows through passage 17 and charges the chamber 16 and thence through feed groove 22, charging chamber 23 with fluid under pressure. Fluid also flows from chamber 16 through port 26 to the chamber containing spring 19 and from said chamber through port 27 to the chamber between the spring stop 18 and movable abutment 20.

The fluid pressures on all parts of the valve mechanism in cap 12 are thus equalized and the parts normally remain in the position shown.

In order to effect an application of the brakes, the brake pipe pressure is reduced in the usual manner, and this causes the higher auxiliary reservoir pressure to shift piston 13 to its outer seat, closing the passage 24. The fluid pressure in piston chamber 2 is reduced, however, by way of passage 28 containing check valve 29, and the triple valve parts are then moved to application position.

The flow of fluid from the auxiliary reservoir to the brake cylinder in applying the brakes causes a reduction in pressure in chamber 16 at a greater rate than the pressure in chamber 23 can reduce by back flow through feed groove 22, with the result that the movable abutment 20 is forced inwardly by the excess pressure in chamber 23, so that the ring 21 is brought to its seat and communication through feed groove 22 is cut off.

This movement of the abutment 20 is such that the spring stop 18 is engaged by the abutment and the spring 19 is compressed.

By this means a differential spring pressure is created which has to be overcome before the piston 13 can lift from its seat.

Upon increasing the brake pipe pressure to effect the release of the brakes, the flow from brake pipe to piston chamber 2 is at first cut off by the piston 13 and it is necessary to increase the brake pipe pressure to a predetermined degree above the auxiliary reservoir pressure before the piston 13 will lift. This differential pressure is determined by the relative area of piston 13 which is exposed to brake pipe pressure in the seated position and by spring 19 which is temporarily held compressed by the abutment 20.

After the brake pipe pressure has been increased to the necessary degree, the piston 13 is lifted from its seat, and the full area being then exposed to brake pipe pressure, a prompt movement of the piston 13 to its normal inner position takes place, and the abutment 20 is also forced outwardly to its normal position in which the feed groove 22 is opened.

Fluid can now flow from the brake pipe 4 through passages 15 and 24 to piston chamber 2 and through differential pressure thus produced, acting on piston 5 insures its prompt movement to release position, in spite of any tendency to stick or leak.

Having now described my invention, what I claim as new and desire to secure by Letters Patent, is:—

1. In a fluid pressure brake, the combination with a brake pipe and an equalizing valve device operated upon a reduction in brake pipe pressure for effecting an application of the brakes, of means for controlling communication from the brake pipe to said equalizing valve device, a movable abutment, and a spring interposed between said abutment and said means.

2. In a fluid pressure brake, the combination with a brake pipe and an equalizing valve device operated upon a reduction in brake pipe pressure for effecting an application of the brakes, of a piston for controlling communication through which fluid is supplied from the brake pipe to said equalizing valve device, a spring adapted to act on said piston, and a movable abutment operated upon applying the brakes for compressing said spring.

3. In a fluid pressure brake, the combination with an auxiliary reservoir, brake pipe, and a triple valve device, of a piston subject to the opposing pressures of the brake pipe and auxiliary reservoir for controlling communication through which fluid is supplied from the brake pipe to the triple valve device, a spring acting on said piston, and a movable abutment subject to the opposing pressures of the auxiliary reservoir and a chamber and operated upon reducing the auxiliary reservoir pressure in applying the brakes for compressing said spring.

4. In a fluid pressure brake, the combination with a brake pipe, auxiliary reservoir, and equalizing valve device subject to the opposing pressures of the auxiliary reservoir and the brake pipe, of means constantly subject on one side to auxiliary reservoir pressure for controlling communication through which fluid is supplied from the brake pipe to said equalizing valve device.

5. In a fluid pressure brake, the combination with a brake pipe, auxiliary reservoir, and equalizing valve device subject to the opposing pressures of the auxiliary reservoir and the brake pipe, of means constantly subject on one side to auxiliary reservoir pressure and operated upon reducing the brake pipe pressure to cut off communication through which fluid is supplied from the brake pipe to said equalizing valve device.

In testimony whereof, I have hereunto set my hand.

WALTER V. TURNER.

Copies of this patent may be obtained for five cents each, by addressing the "Commissioner of Patents, Washington, D. C."